Sept. 25, 1928.

W. M. WHITE

HYDRAULIC TURBINE

Filed Aug. 23, 1926

1,685,261

Inventor
W. M. White
by
Attorney

Patented Sept. 25, 1928.

1,685,261

UNITED STATES PATENT OFFICE.

WILLIAM M. WHITE, OF MILWAUKEE, WISCONSIN.

HYDRAULIC TURBINE.

Application filed August 23, 1926. Serial No. 130,819.

This invention relates in general to improvements in hydraulic turbines, and relates more specifically to improvements in the construction and operation of inlet guide vane mechanisms for hydraulic turbines of the reaction type.

An object of the invention is to provide improved inlet guide vane mechanism for hydraulic turbines or the like, whereby more uniform and efficient guiding of the liquid is effected with respect to the rotors of such machines.

It is common practice in the construction and operation of hydraulic turbines of the reaction type, to conduct the water toward the turbine rotor through a speed ring having an annular series of fixed vanes therein and formed to deliver the water inwardly past an annular series of movable guide vanes, toward the rotor. The fixed speed ring vanes are ordinarily disposed tangentially with respect to a circle circumscribing the rotor axis, and the movable guide vanes cooperate with the fixed speed ring vanes to control both the quantity of water admitted to the rotor and the degree of whirl of the entering water. When utilizing some forms of movable guide vanes, and especially the well known form having unsymmetrical cross-section with respect to the pivotal axes thereof, it is found that the movable guide vanes do not properly cooperate with the fixed speed ring guide vanes in order to insure uniform admission of liquid at all portions of the annular inlet conduit. The unsymmetrical type of guide vane is however relatively efficient, and it is an object of the present invention to enable the use of this highly efficient type of movable guide vane while retaining effective admission of liquid to all portions of the rotor. In accordance with the present invention, some of the movable guide vanes are shaped differently from others and the guide vanes are so located relative to the speed ring vanes, that uniform admission of fluid through all portions of the inlet conduit is obtained.

A clear conception of an embodiment of the invention and of the mode of constructing devices in accordance therewith, may be had by referring to the drawing accompanying and forming a part of this specification in which like reference characters designate the same or similar parts in the several views.

Figure 1:
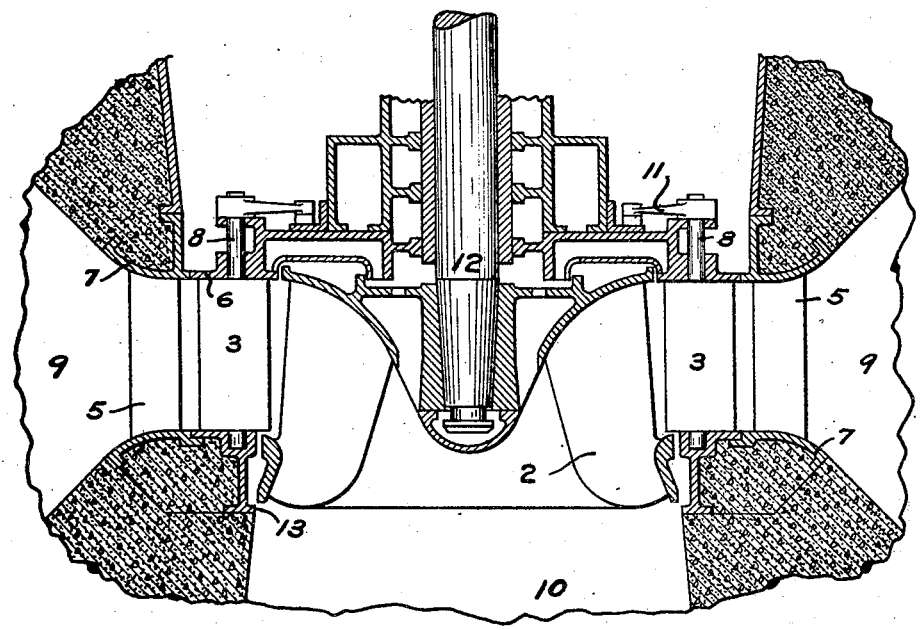
Fig. 1 is a central vertical section through a Francis type of hydraulic turbine.

The hydraulic turbine unit to which the invention has been specifically applied by way of illustration, comprises in general a rotor 2 disposed within a casing formed of top and bottom sections 6, 13, and adapted to receive a supply of operating liquid such as water from an annular inlet conduit 9 and to deliver the liquid to a draft tube 10 of usual construction. The inlet conduit 9 communicates with an annular speed ring 7 which surrounds the rotor axis and provides an inwardly directed inlet passage. The inlet passage of the speed ring 7 is spanned by an annular series of fixed speed ring vanes 5 which are preferably disposed tangentially with respect to a circle circumscribing the rotor axis. An annular series of adjustable or movable guide vanes 3, 4, is disposed between the fixed vanes 5 and the periphery of the rotor 2, each of the movable vanes being supported in the casing top and bottom sections 6, 13 by means of a pivot 8. All of the movable guide vanes 3, 4 are simultaneously adjustable about their pivotal axes by adjusting mechanism 11 associated with the vane pivots 8. The vane adjusting mechanism 11 is associated with the top section 6 of the turbine casing, and this top section also provides a support for the main shaft 12 of the turbine.

Figure 2:
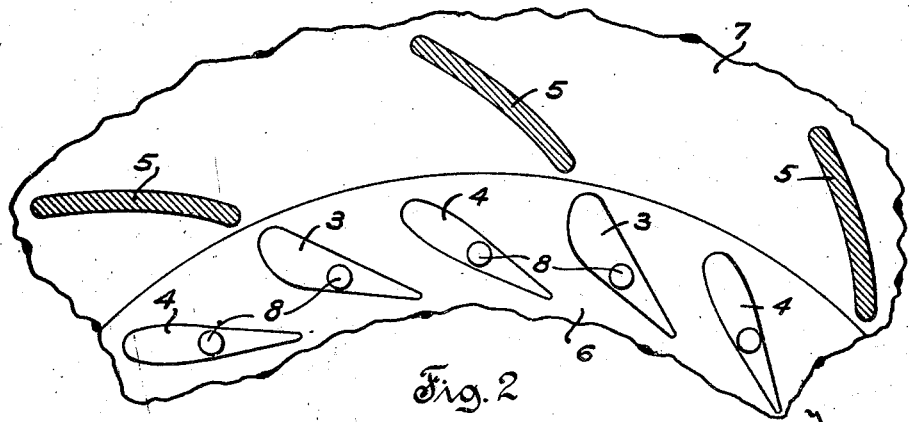
Fig. 2 is an enlarged transverse section through the inlet mechanism of a Francis type hydraulic turbine embodying the improvement.

As will be apparent from Fig. 2, the movable guide vanes 3 which are disposed directly in line with the fixed speed ring vanes 5, are unsymmetrical in shape. These vanes are of a type well known in the art and are extremely efficient in operation. If the same type of movable vanes 3 are employed throughout the inlet portions of the vanes disposed between the successive speed ring vanes 5, undesirably throttle the inlet passages adjacent to the inner faces of the speed ring vanes 5. In order to eliminate such undesirable throttling, the alternate movable vanes 4 are formed of symmetrical cross-section, thereby widening the passages adjacent to the inner faces of the fixed vanes 5 without materially affecting the passages at the outer faces of the adjacent unsymmetrical vanes 3.

From the disclosure of Fig. 2, it will be apparent that the use of symmetrical intermediate vanes 4 in conjunction with the unsymmetrical vanes 3 adjoining the speed ring vanes 5, produces uniform inlet passages communicating with the movable guide vane structure through the spaces between the successive fixed vanes 5, thus insuring uniform distribution and admission of liquid through all portions of the inlet conduit within which the movable vanes are disposed. This result is obviously effected without materially altering the shape of the passages between the movable guide vanes 3, 4, thus maintaining substantially the same high efficiency which is obtainable with the use of unsymmetrical vanes 3 alone. The movable vanes 3, 4 may be readily formed to insure tight closing and proper cooperation therebetween at all times, and while these vanes have been illustrated somewhat diagrammatically, both types of vanes 3, 4 are of well known construction in the art.

It should be understood that it is not desired to limit the invention to the exact details of construction and arrangement of the elements herein shown and described, for various modifications within the scope of the claims may occur to persons skilled in the art.

It is claimed and desired to secure by Letters Patent:

1. In combination, a rotor, a series of fixed vanes disposed about the axis of said rotor, and a series of movable vanes located between said fixed vanes and said rotor, some of the movable vanes having different shape than others.

2. In combination, a rotor, a series of fixed vanes disposed about the axis of said rotor, and a series of movable vanes located between said fixed vanes and said rotor, alternate movable vanes of said series having like shape and adjacent movable vanes having different shape.

3. In combination, a rotor, an annular series of fixed vanes disposed about the axis of said rotor, and an annular series of movable vanes located between said fixed vanes and the said rotor, some of the movable vanes having different cross-sectional shape than others.

4. In combination, a rotor, an annular series of fixed vanes disposed about and tangentially relative to a circle circumscribing the axis of said rotor, and an annular series of movable vanes located between said fixed vanes and said rotor, alternate movable vanes of said series having like transverse cross-section and the adjacent movable vanes having different transverse cross-section.

5. In combination, a rotor, an annular series of fixed vanes disposed about the axis of said rotor, and an annular series of movable vanes located between said fixed vanes and said rotor, the number of movable vanes being greater than the number of fixed vanes and some of said movable vanes being of different shape than others.

6. In combination, a rotor, an annular series of fixed vanes disposed about the axis of said rotor, an annular series of movable vanes each having unsymmetrical cross-section disposed in line with said fixed vanes, and a second series of movable vanes having symmetrical cross-section disposed between the movable vanes of said first mentioned series.

7. In combination, a rotor, an annular series of fixed vanes disposed about the axis of said rotor, and an annular series of movable vanes each having unsymmetrical cross-section and being disposed in line with a fixed vane, and an intermediate series of movable vanes each having symmetrical cross-section and being disposed out of line with said fixed vanes.

In testimony whereof, the signature of the inventor is affixed hereto.

WILLIAM M. WHITE.